United States Patent
Kwon et al.

(10) Patent No.: US 8,009,764 B2
(45) Date of Patent: Aug. 30, 2011

(54) METHOD AND APPARATUS FOR IMPROVING PAPR IN OFDM OR OFDMA COMMUNICATION SYSTEM

(75) Inventors: Yeong Hyeon Kwon, Gyeonggi-do (KR); Seung Hee Han, Seoul (KR); Min Seok Noh, Seoul (KR); Young Woo Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 485 days.

(21) Appl. No.: 12/093,131

(22) PCT Filed: Nov. 9, 2006

(86) PCT No.: PCT/KR2006/004680
§ 371 (c)(1),
(2), (4) Date: Sep. 19, 2008

(87) PCT Pub. No.: WO2007/055518
PCT Pub. Date: May 18, 2007

(65) Prior Publication Data
US 2009/0304108 A1    Dec. 10, 2009

(30) Foreign Application Priority Data
Nov. 9, 2005    (KR) .................. 10-2005-0106914

(51) Int. Cl.
*H04L 25/49*    (2006.01)
(52) U.S. Cl. ....................................... 375/296
(58) Field of Classification Search ......... 375/260, 375/295–296; 370/208, 210; 455/63.1, 114.2–114.3
See application file for complete search history.

(56) References Cited

U.S. PATENT DOCUMENTS

| | | | |
|---|---|---|---|
| 6,845,082 B2 * | 1/2005 | Bourget et al. | 370/210 |
| 7,340,006 B2 * | 3/2008 | Yun et al. | 375/296 |
| 2002/0075840 A1 | 6/2002 | Vadde | |
| 2003/0086363 A1 | 5/2003 | Hernandez | |
| 2004/0160893 A1 | 8/2004 | Park et al. | |

(Continued)

FOREIGN PATENT DOCUMENTS

EP        1515504        3/2005
(Continued)

OTHER PUBLICATIONS

A.D.S. Jayalath et al., "Reduced Complexity PTS and New Phase Sequences for SLM to Reduce PAP of an OFDM Signal," Vehicular Technology Conference Proceedings, pp. 1914-1917, May 2000.

(Continued)

*Primary Examiner* — Khanh C Tran
(74) *Attorney, Agent, or Firm* — Lee, Hong, Degerman, Kang & Waimey

(57) ABSTRACT

A method and apparatus for diminishing a peak power to average power ratio (PAPR) in an OFDM/OFDMA communication system are disclosed, by which complexity in an OFDM/OFDMA communication system can be reduced. In an OFDM or OFDMA communication system, the present invention includes a circular shift module circularly shifting to output at least one or more data sequences according to circular shift information to be applied to each of the at least one or more data sequences converted to a time domain from a frequency domain, a combining module combining the at least one or more data sequences outputted from the circular shift module, and a PAPR calculating module calculating the PAPR of an entire data sequence combined by the combining module.

7 Claims, 5 Drawing Sheets

U.S. PATENT DOCUMENTS

2006/0104377 A1* 5/2006 Chimitt et al. ................ 375/261

FOREIGN PATENT DOCUMENTS

| EP | 1601150 | 11/2005 |
|----|---------|---------|
| GB | 2412826 | 10/2005 |
| JP | 2004-155033 | 6/2004 |
| WO | 2004/073182 | 8/2004 |

OTHER PUBLICATIONS

S. Jiyun et al., "Iterative Control of PAPR Reduction Using MCP Criteria," Proceedings of the 2005 IEICE General Conference, NTT Docomo's Wireless Institute, B-5-52, Mar. 2005.

S. Jiyun et al., "Peak-to-Average Ratio (PAPR) Reduction Using Cyclic Shifting with Iterative Control for OFDM," NTT Docomo's Wireless Institute, B-5-95, Sep. 2004.

G. Hill et al., "Cyclic Shifting and Time Inversion of Partial Transmit Sequences to Reduce the Peak-to-Average Power Ratio in OFDM," Personal, Indoor and Mobile Radio Communications, pp. 1256-1259, Sep. 2000, XP-010520833.

S.H. Han et al., "An Overview of Peak-to-Average Power Ratio Reduction Techniques for Multicarrier Transmission," IEEE Wireless Communications, pp. 56-66, Apr. 2005, XP-002389021.

* cited by examiner

METHOD AND APPARATUS FOR IMPROVING PAPR IN OFDM OR OFDMA COMMUNICATION SYSTEM

CROSS-REFERENCE TO RELATED APPLICATIONS

This application is the National Stage filing under 35 U.S.C. §371 of International Application No. PCT/KR06/04680, filed on Nov. 9, 2006, which claims the benefit of earlier filing date and right to priority to Korean Application No. 10-2005-0106914, filed on Nov. 9, 2005.

TECHNICAL FIELD

The present invention relates to an OFDM (orthogonal frequency division multiplexing) or OFDMA communication system, and more particularly, to a method and apparatus for diminishing a peak power to average power ratio (PAPR) in an OFDM/OFDMA communication system.

BACKGROUND ART

Generally, the OFDM scheme is widely used for wire/wireless communication fields. The OFDM is the scheme most frequently discussed in communication fields together with CDMA (code division multiple access). Yet, an OFDM or CDMA system has worse PAPR than other communication systems. In a communication system, performance of an output amplifier of a transmitter largely depends on PAPR. If the PAPR increases, a linear interval of the output amplifier should be correspondingly widened. This results in inefficient communications.

Importance of PAPR in an OFDM system is much greater than that in a CDMA system. The reason is explained as follows. In case of the CDMA system, since user signals are summed together in time domain, it is able to deliver the user signals by manipulating the user signals in time domain. On the other hand, in case of the OFDM system, user data exists in frequency domain. So, conversion between frequency domain and time domain should be carried out to find PARR in time domain. In particular, domain conversion work should be conducted in proportion to an application count in the process of selecting a minimum PAPR using various candidate codes or schemes in the OFDM system. So, system complexity may increase.

In the related art, PARR improving schemes can be classified into an improving scheme in frequency domain and an improving scheme in time domain. A phase randomization scheme, a selective mapping scheme, and the like belong to the improving schemes in frequency domain. And, a PTS (partial transmit sequence) scheme is a representative one of the improving schemes in time domain.

FIG. 1 is a block diagram to explain a method of diminishing PAPR in frequency domain according to a related art.

Referring to FIG. 1, assuming that a data vector to be transmitted in an OFDM system is $\vec{d}=[d^0, d^1, \ldots, d^{N-1}]^T$, a signal transmitted in time domain can be obtained through inverse fast Fourier transform (IFFT) shown in Equation 1.

$$\vec{s}=[s_0, s_1, \ldots, s_{N-1}]^T = F^{-1}\vec{d} \quad \text{[Equation 1]}$$

In Equation 1, F is a Fourier transform matrix. A vector $\vec{s}$ is a signal to be transmitted via an antenna by being modulated into a carrier frequency. A variation of an absolute value of the transmission signal vector $\vec{s}$ is represented as PAPR. And, the PAPR can be defined as Equation 2.

$$PAPR = \frac{\max_{k=0,\ldots,N-1} |s_k|^2}{\frac{1}{N}\sum_{k=0}^{N-1} |s_k|^2} \quad \text{[Equation 2]}$$

As can be seen from Equation 2, if any one of vector components has an abnormally large value, the PAPR increases to degrade signal characteristics. To solve this problem, a method used in frequency domain can be represented as Equation 3.

$$\vec{d}_x = M_S M_P \vec{d} \quad \text{[Equation 3]}$$

In Equation 3, $M_S$ is a matrix (phase shift matrix) that changes a phase component of each data component of $\vec{d}$ and $M_P$ is a matrix (position permutation matrix) that plays a role in changing a sequence of data component (Phase shift and position permutation block in FIG. 1).

In the related art PAPR improving scheme in frequency domain, in order to make PAPR attenuate according to Equation 3, signals in time domain are found using various combinations of $M_S$ and $M_P$ and the signal having the best performance is then selected. So, in order to execute PAPR improvement in frequency domain, N-sized IFFT should be used to find the PAPR for the various combinations of $M_S$ and M. And, complexity of $N\log_2 N$ is added each transform.

Unlike the above-explained performance improving method through time domain conversion after completion of data conversion in frequency domain, a PTS scheme is able to directly improve PAPR in time domain. In the PTS scheme, data symbols are grouped into predetermined groups without converting the data symbols in frequency domain and each of the groups is converted to time domain. Before summing the converted symbols in time domain into one, the symbols are multiplied by different phase patterns, respectively and are then summed together. However, since the PTS scheme needs a step of multiplying the symbols by the different phase patterns, respectively, it may raises complexity in system implementation.

DISCLOSURE OF THE INVENTION

Accordingly, the present invention is directed to a method and apparatus for diminishing a peak power to average power ratio (PAPR) in an OFDM/OFDMA communication system that substantially obviate one or more of the problems due to limitations and disadvantages of the related art.

An object of the present invention is to provide a method and apparatus for diminishing a peak power to average power ratio (PAPR) in an OFDM/OFDMA communication system, by which complexity in an OFDM/OFDMA communication system can be reduced.

Another object of the present invention is to provide a method and apparatus for diminishing a peak power to average power ratio (PAPR) in an OFDM/OFDMA communication system, by which convenience for implementation in an OFDM/OFDMA communication system can be raised.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in an OFDM or OFDMA communication system, a method of diminishing a PAPR (peak power to average power ratio) according to the present invention comprises a first step of circularly shifting to output at least one data sequences according to circular shift information to be applied to each of the at least one data sequences converted to a time domain from a frequency domain; a second step of combining the at least one data sequences outputted from the first step; a third step of calculating the PAPR of an entire data sequence combined in the second step; and a fourth step of outputting the entire data sequence corresponding to a specific PAPR selected from a plurality of PAPRs obtained from repeating the first to third steps at least once using different circular shift information.

To further achieve these and other advantages and in accordance with the purpose of the present invention, in an OFDM or OFDMA communication system, an apparatus for diminishing a PAPR (peak power to average power ratio) a circular shift module circularly shifting to output at least one data sequences according to circular shift information to be applied to each of the at least one data sequences converted to a time domain from a frequency domain; a combining module combining the at least one data sequences outputted from the circular shift module; and a PAPR calculating module calculating the PAPR of an entire data sequence combined by the combining module.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
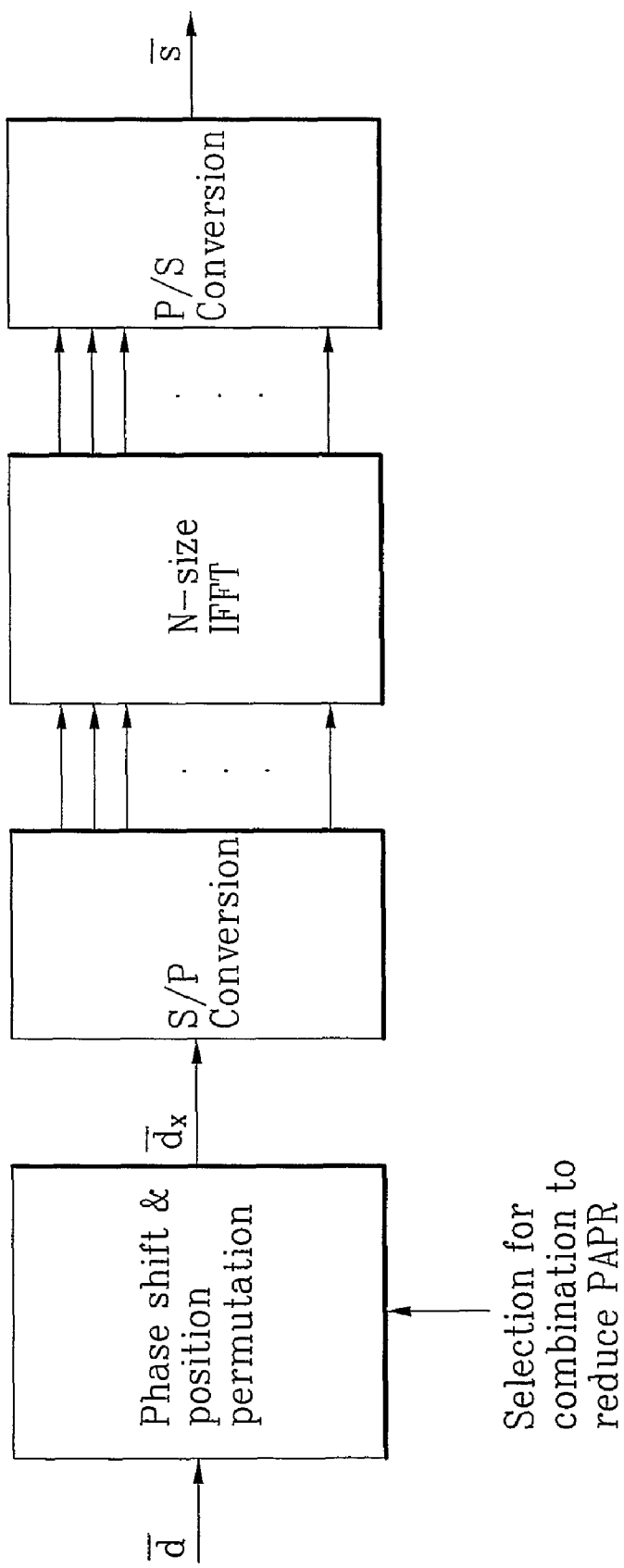
FIG. 1 is a block diagram to explain a method of diminishing PAPR in frequency domain according to a related art.
Figure 2:
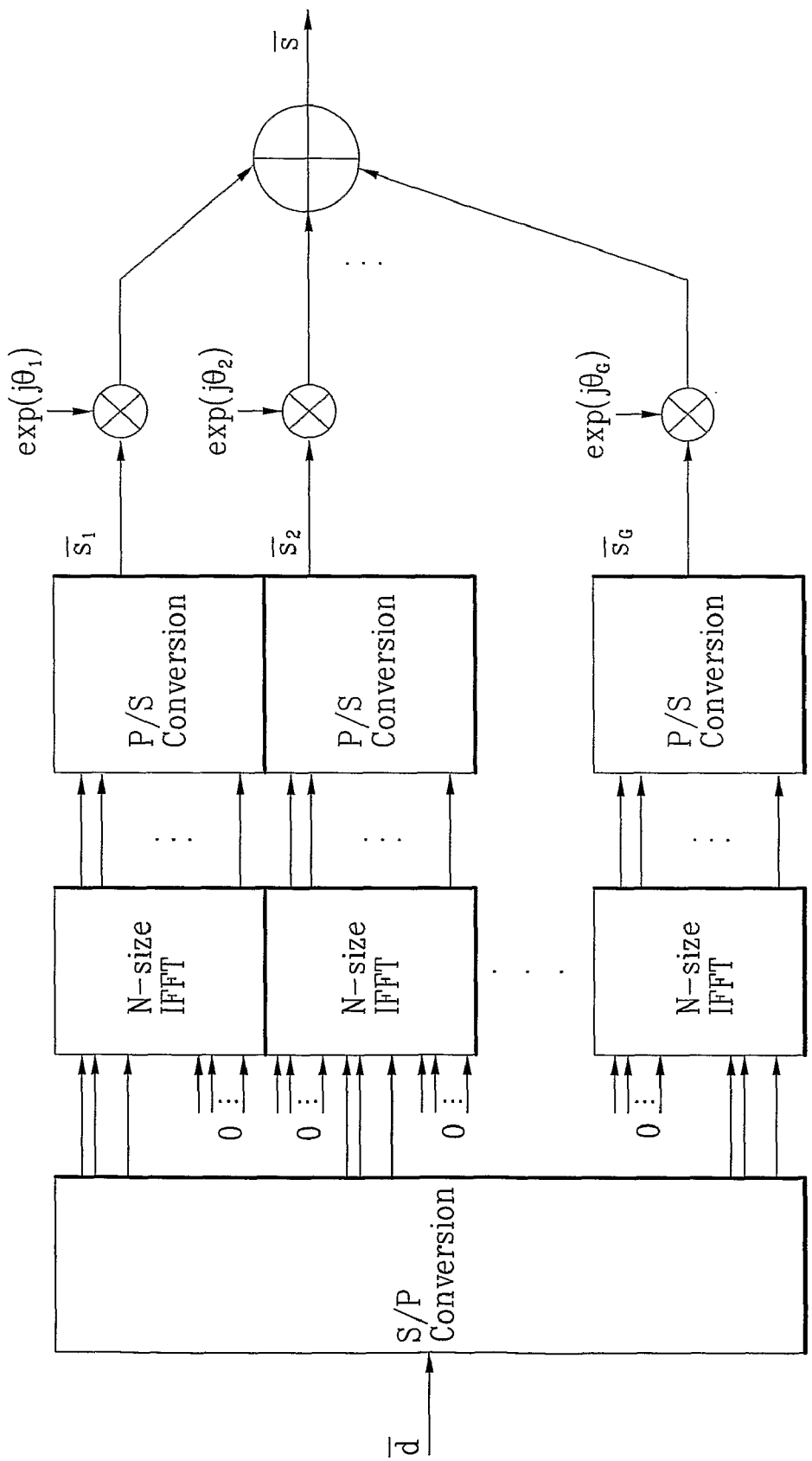
FIG. 2 is a block diagram of a transmitting apparatus for PAPR improvement.
Figure 3:
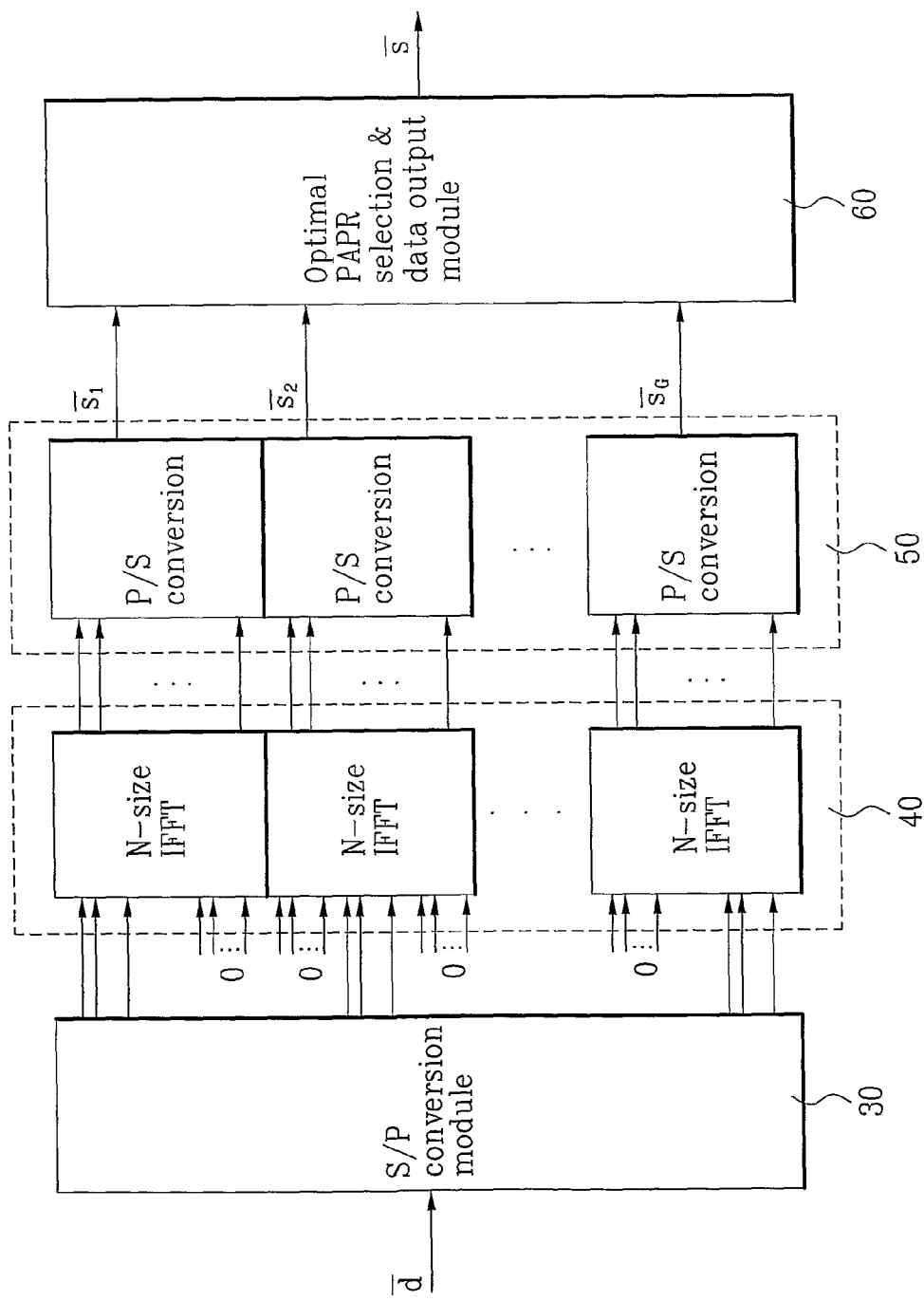
FIG. 3 is a block diagram of a transmitting apparatus for PAPR improvement according to one preferred embodiment of the present invention.

FIG. 3 is a block diagram of a transmitting apparatus for diminishing PAPR according to one preferred embodiment of the present invention.

Referring to FIG. 3, a transmitter according to one preferred embodiment of the present invention includes an S/P conversion module 30, an IFFT module 40, a P/S conversion module 50 and an optimal PAPR selection and data output module 60.

The S/P conversion module 30 converts a serial input data vector $\vec{d}=[d^0, d^1, \ldots, d^{N-1}]^T$ to parallel data divided into a plurality of groups, adds redundant bits to necessary positions of the groups, respectively, and then outputs each of the groups. Data symbols divided per the group configure G vectors shown in Equation 4.

$$\vec{d} = \vec{d}_1 + \vec{d}_2 + \ldots + \vec{d}_G, \quad \text{[Equation 4]}$$

where G is a number of groups.

The per group data vector $\vec{d}_k$ (k=1, ..., G) to which the redundant bits are added by the S/P conversion module 30 can be given by Equation 5.

$$\vec{d}_k = \{0_{1 \times (k-1)N/G}, d_{1+(k-1)N/G}, d_{2+(k-1)N/G}, \ldots, d_{N/G-1+(k-1)N/G}, 0_{1 \times (N-k)N/G}\} \quad \text{[Equation 5]}$$

Alternatively, the S/P conversion module 30 is able to output a per-group parallel data sequence, to which redundant bits are not added, in Equation 4 as it is.

The IFFT module 40 produces a signal $\vec{s}_k$ (k=1, ..., G) by transforming the per-group data vector outputted by the S/P conversion module 40 into time domain by the inverse fast fourier transform (IFFT). The P/S conversion module 50 converts the per-group parallel data sequence IFFT-transformed by the IFFT module 40 to a serial data sequence and then outputs the serial data sequence.

Figure 4:
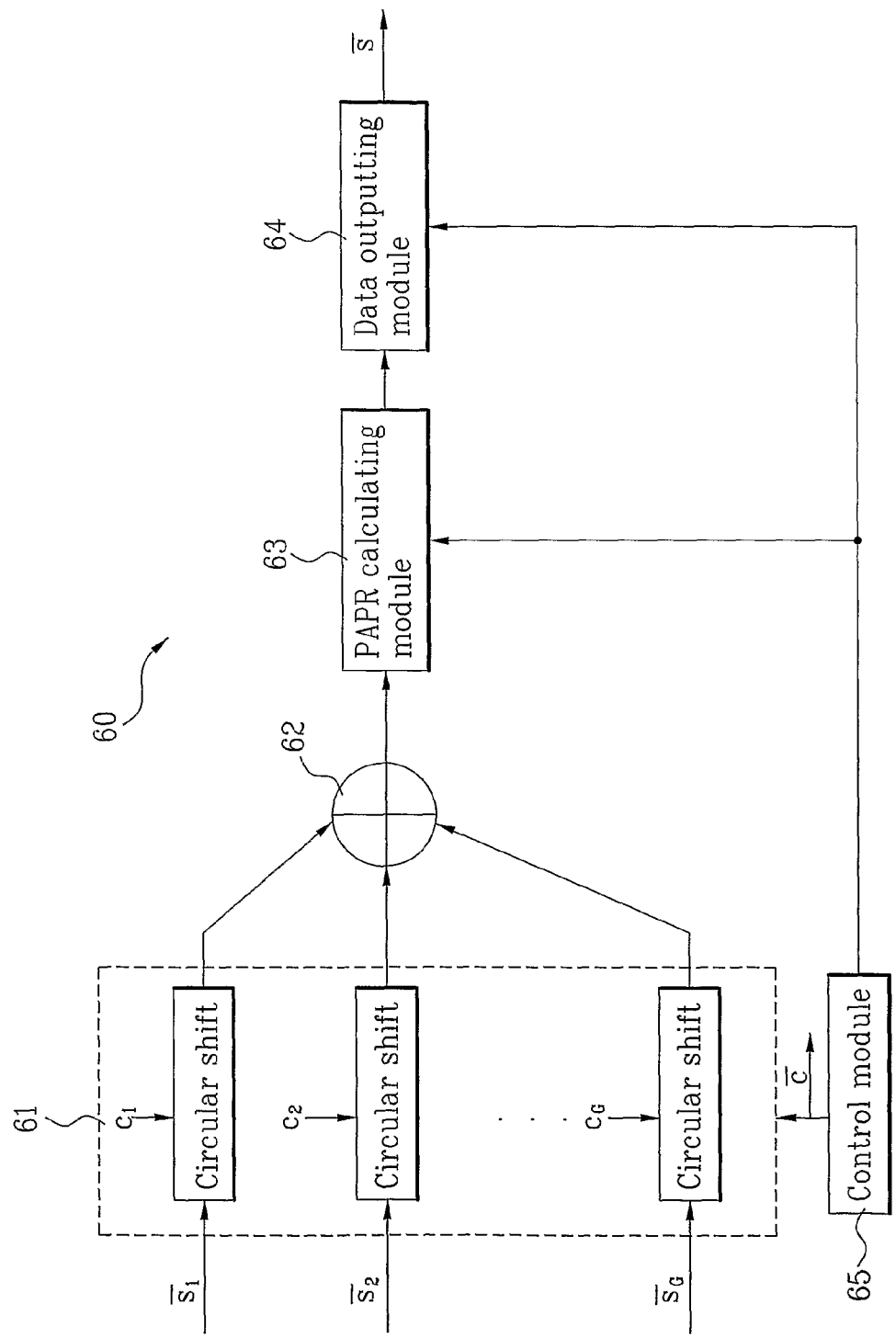
FIG. 4 is a detailed block diagram of an optimal PAPR selection and data output module shown in FIG. 2.

The optimal PAPR selection and data output module 60 outputs entire data sequences corresponding to optimal PAPR using the per-group data sequence converted to the serial data sequence by the P/S conversion module 50. FIG. 4 is a detailed block diagram of the optimal PAPR selection and data output module 60.

Referring to FIG. 4, the optimal PAPR selection and data output module 60 includes a circular shift module 61, a summing module 62, a PAPR calculating module 63, a data outputting module 74 and a control module 65.

The circular shift module 61 circularly shifts to output the per-group data sequence converted to the serial data sequence by the P/S conversion module 50 according to circular shift information $\vec{c}$ inputted by the control module 65. The circular shift information $\vec{c}$ the information for an interval by which the per-group data sequence should be circularly shifted and can be represented as Equation 6.

$$\vec{c} = [c_1, c_2, \ldots, c_G]^T \quad \text{[Equation 6]}$$

For instance, if a data sequence ($\vec{s}_k = [s_k^0, s_k^1, \ldots, s_k^{N-1}]$) of a $k^{th}$ group is circularly shifted by circular shift information ($c_k$), it results in $\vec{s}_k^{c_k} = [s_k^{N-c_k}, s_k^{N-c_k+1}, \ldots s_k^{N-1}, s_k^0, s_k^1, \ldots, s_k^{N-c_k-1}]$.

The circular shift module 61 can be implemented by a simple configuration in a manner of storing each of the per-group data sequences converted to the serial data sequences by the P/S conversion module 50 in a memory and then outputting the stored data sequences in order changed according to the circular shift information inputted by the control module 65.

The combining (summing) module 62 sums up to combine the per-group data sequences outputted from the circular shift module 61 together. The entire summed data sequences can be represented as Equation 7.

$$\vec{s} = \sum_{k=1}^{G} \vec{s}_k^{c_k}$$ [Equation 7]

The PAPR calculating module 63 calculates a peak power to average power ratio (PAPR) of the entire data sequences combined together by the combining module 62. It is able to calculate the PAPR in various ways including Equation 2.

As mentioned in the foregoing description, the control module 65 provides the circular shift information ($\vec{c}$) to the circular shift module 61. When the control module 65 provides the circular shift information to the circular shift module 61, the control module 65 preferably provides circular shift information enabling better PAPR to be calculated with reference to the PAPR calculated by the PAPR calculating module 63. Preferably, the control module 65 provides different circular shift information plural times until deciding that optimal PAPR is selected. And, the control module 65 is able to control overall operations of the optimal PAPR selection and data output module 60. In this case, the overall operations of the module 60 include an operation of selecting an optimal PAPR from a plurality of PAPR calculation values, an operation of enabling the data outputting module 64 to output the entire data sequence corresponding to the optimal PAPR, etc.

The data outputting module 64 outputs an entire data sequence $\vec{s}$ corresponding to a specific PAPR selected from the PAPR values calculated by the PAPR calculating module 63 according to at least two different circular shift information. Preferably, a smallest one of the PAPR values calculated by the PAPR calculating module 63 is selected as the specific PAPR.

Figure 5:
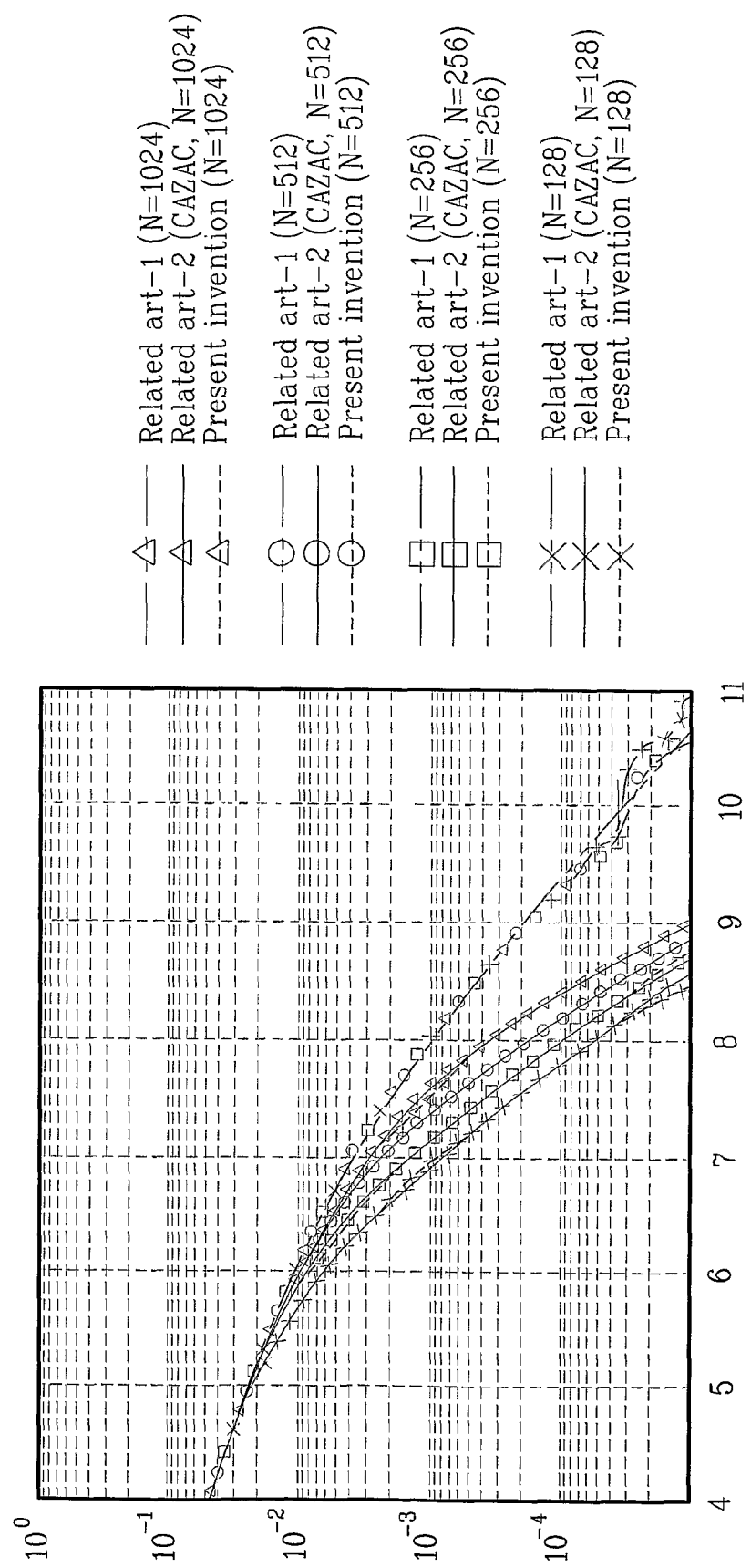
FIG. 5 is a graph of a simulation result to compare effects of the present invention to those of the related art.

Accordingly, in order to improve PAPR in the OFDM or OFDMA communication system, it is unnecessary to multiply a data sequence by a phase component. So, the present invention facilitates the corresponding implementation. The present invention enables improvement of PAPR by operations in time domain, thereby reducing complexity without inter-domain transform. As a result of simulation, it is proved that a PAPR improving effect can obtain performance similar to that of another scheme having a similar overhead. FIG. 5 is a graph of a simulation result to compare effects of the present invention to those of the related art. In FIG. 5, the related art-1 indicates the PAPR scheme by multiplying a phase component without data processing and the related art-2 indicates the PAPR scheme by varying a phase using the CAZAC (constant amplitude zero autocorrelation) sequence in frequency domain. And, a symbol size of OFDM is set to N=128, 256, 512 or 1024. As can be seen from FIG. 5, there is almost no performance difference between the related and the present invention. So, it is proved that the present invention is the scheme capable of obtaining the same performance without such a calculation as a domain transform, a phase component multiplication and the like.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, technical features of the present invention are applicable to an OFDM or OFDMA communication system.

What is claimed is:

1. A method of diminishing peak to average power ratio (PAPR) in an OFDM or OFDMA communication system, the method comprising:
    a first step of circularly shifting each of at least two data sequences that have been converted to a time domain from a frequency domain according to first circular shift information to generate at least two circularly shifted data sequences, wherein circularly shifting each of the at least two data sequences comprises:
        storing each of the at least two data sequences, and
        outputting each of the stored at least two data sequences according to the circular shift information;
    a second step of combining the at least two circularly shifted data sequences to generate a combined data sequence;
    a third step of calculating the PAPR of the combined data sequence; and
    a fourth step of outputting an entire combined data sequence corresponding to a specific PAPR selected from a plurality of PAPRs calculated by repeating the first, second, and third steps at least once using circular shift information that is different from the first circular shift information.

2. The method of claim 1, wherein the second step of combining the at least two circularly shifted data sequences comprises summing corresponding symbols of the at least two circularly shifted data sequences.

3. The method of claim 1, wherein the selected specific PAPR has a smallest value among the plurality of PAPRs.

4. An apparatus for diminishing a peak power to average power ratio (PAPR) in an OFDM or OFDMA communication system, the apparatus comprising:
    a circular shift module configured to generate at least two circularly shifted data sequences by circularly shifting each of at least two data sequences converted to a time domain from a frequency domain, wherein circularly shifting is performed according to first circular shift information applied to each of the at least two data sequences;
    a combining module configured to generate a combined data sequence by combining the at least two circularly shifted data sequences;
    a PAPR calculating module configured to calculate the PAPR of the combined data sequence; and
    a control module configured to transfer the first circular shift information to the circular shift module,
    wherein the circular shift module includes a memory module configured to store each of the at least two data sequences.

5. The apparatus of claim 4, further comprising a data outputting module configured to output an entire combined data sequence corresponding to a specific PAPR selected from a plurality of PAPRs, wherein the plurality of PAPRs are calculated by the PAPR calculating module using circular shift information that is different from the first circular shift information.

6. The apparatus of claim 4, wherein the combining module is further configured to combine the at least two circularly shifted data sequences by summing corresponding symbols of the at least two circularly shifted data sequences.

7. The apparatus of claim 4, wherein the selected specific PAPR has a smallest value among the plurality of PAPRs.

* * * * *